Sept. 20, 1960     L. HOFMANN     2,953,207
CONTROL FOR HELICOPTER ROTORS AND THE LIKE Filed Dec. 5, 1956     2 Sheets-Sheet 1

Inventor.
Ludwig Hofmann
By Michael S. Striker

United States Patent Office 2,953,207
Patented Sept. 20, 1960

2,953,207

CONTROL FOR HELICOPTER ROTORS AND THE LIKE

Ludwig Hofmann, Buehl, Germany, assignor to Fa. Boelkow-Entwicklungen Kommanditgesellschaft, Stuttgart-Flughafen, Germany Filed Dec. 5, 1956, Ser. No. 626,409

Claims priority, application Germany Dec. 7, 1955

19 Claims. (Cl. 170—160.16)

The present invention relates to control apparatus such as controls for the blade pitch of a helicopter.

When a helicopter, for example, suddenly has its motor stop running while in flight, it is necessary to immediately adjust the blade pitch of the helicopter rotor within a period of a few seconds to a proper blade pitch for such operating conditions. If the pilot neglects to make the necessary adjustment a serious fall can occur when the motor stops running. Therefore, it is customary to provide devices such as helicopters with automatic controls which automatically adjust the blade pitch to a proper value when the speed of rotation of the rotor falls below a given value, and it is unnecessary for the pilot to make such an adjustment.

However, when flying at low altitudes it is undesirable to provide this automatic adjustment of the blade pitch since when the motor stops running and the blade pitch is automatically lowered while the helicopter is at a low altitude a very rough landing takes place. It is thus desirable when the helicopter drive fails at low altitudes to increase the blade pitch angle in order to make it possible to land gently.

It is therefore an object of the present invention to provide a process and apparatus according to which the pilot can manually influence the automatic blade pitch control.

It is a more general object of the present invention to provide an automatic control apparatus which can be manually influenced whenever the automatic controls are not desired.

A further object of the present invention is to provide a control of the above type which is simple and inexpensive to manufacture and which can be easily incorporated into existing control devices.

With the above objects in view the present invention mainly consists of a control apparatus which includes a manually operable adjusting means for adjusting the position of an element to be controlled, such an element being, for example, a blade of a helicopter rotor whose pitch is controlled by movement of a manually operable adjusting means. An energy storing means is located in the path of movement of the adjusting means to be moved by the latter, and this energy storing means has an inherent force tending to return the energy storing means and the manually operable adjusting means to a rest position from which they are moved by the operator, this force of the energy storing means being small enough to be overcome by the operator. A releasable holding means cooperates with the energy storing means for releasably holding the same against return movement to its rest position, and an automatic means cooperates with the releasable holding means for automatically releasing the same when certain operating conditions occur, so that when these latter conditions occur the manually operable adjusting means can be acted on by the energy storing means or the operator can manually influence the adjusting means against the force of the energy storing means.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

The structure described below relates to the control apparatus of the invention as used in a helicopter, by way of example.

Figure 1:
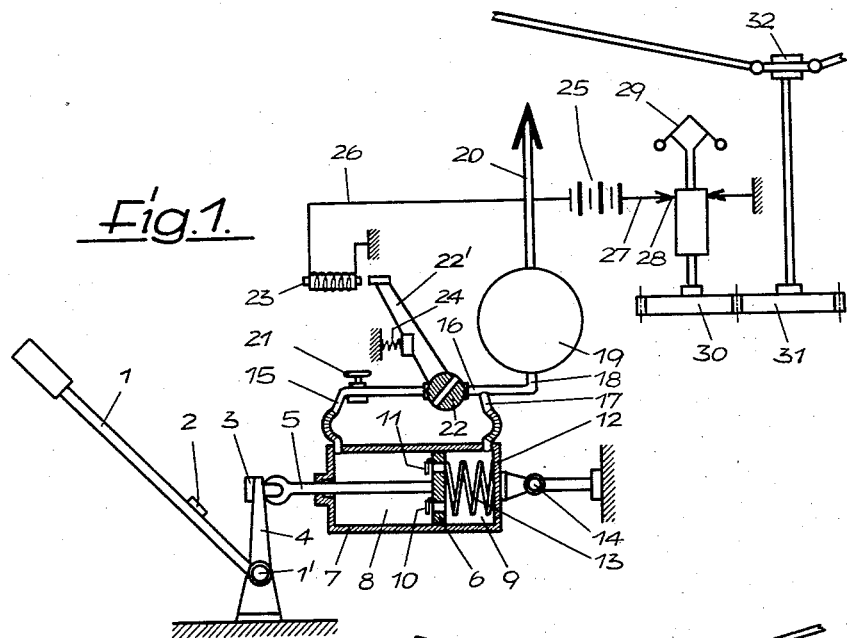
Fig. 1 is a diagrammatic illustration of a control apparatus according to the present invention.

Fig. 1 shows a manually operable adjusting means in the form of a lever 1 which is turned by the pilot in order to adjust the blade pitch of the helicopter rotor, the actual structure which is actuated by the turning of the lever 1 in order to change the pitch angle of the rotor blades being conventional and not shown since it forms no part of the present invention. The lever 1 carries a stop member 2 and is turnable about a pivot pin 1' which is fixedly mounted in the aircraft. The stop 2 cooperates with a stop 3 which is fixed to a lever 4 which is also turnable about the pivot pin 1'. The lever 4 is pivotally connected to a piston rod 5 which is fixed at its end distant from the lever 4 to a piston 6. The piston 6 slides in a cylinder 7 and seals the left chamber 8 of the cylinder 7 from the right chamber 9 thereof. This cylinder is filled with a suitable pressure liquid such as oil, for example. The piston 6 carries a pair of check valves 10 and 11 which prevent the liquid from flowing through the piston from the left chamber 8 to the right chamber 9 but permits a flow of the liquid in the opposite direction from the right chamber 9 to the left chamber 8.

An energy storing means in the form of a coil spring 13 is compressed between the piston 6 and the end wall 12 of the cylinder 7. This end wall 12 of the cylinder is pivotally carried at 14 by the aircraft.

A conduit means 15, 16, 17 communicates with the chambers 8 and 9 of the cylinder 7 so that these chambers are interconnected with each other through this conduit means. The conduit 16 communicates with a conduit 18 which in turn communicates with a supply reservoir 19 which is connected to and communicates with a standpipe 20. A throttle valve 21 is connected into the conduit 15 for controlling the speed of movement of liquid through the conduit means 15, 16, 17. A control valve 22 is located in the conduit 16 for opening and closing the conduit means 15, 16, 17 and liquid flows through this conduit means only when the control valve 22 is in its open position. The control valve 22 is controlled by a lever 22' fixed thereto and the position of the lever 22' is controlled on the one hand by an electromagnet 23 and on the other hand by a compression spring 24. When the electromagnet 23 is energized the lever 22' is held in the illustrated position where the valve 22 is closed, and in this position of the parts the spring 24 is compressed so that it tends to turn the lever 22' in a direction which opens the valve 22, and when the electromagnet 23 is unenergized the spring 24 is released and expands to turn the lever 22' and move the valve 22 to its open position. One pole of a battery 25 is connected through a conductor 26 with one end of the coil of the electromagnet 23, and the other pole of the battery is connected through a conductor 27 and a contact of a switch 28 and through ground with the other end of the coil of the electromagnet. The switch 28 is controlled in the embodiment of Fig. 1 by a centrifugal device 29 which rotates at a speed proportional to that of the main helicopter rotor 32, the latter rotating a gear 31 which meshes with a gear 30 which is connected to the device 29, parts 28 and 29 forming a centrifugally operated switch which in the illustrated embodiment opens when the speed of rotation of the device 29 falls below a predetermined value. When the switch 28 opens the electromagnet 23 is no longer energized so that the spring 24 moves the valve 22 to its open position.

At the beginning of a flight, the operator turns the lever 1 upwardly and the stop 2 engages the stop 3 so as to turn the lever 4 and move the piston 6 to the right within the cylinder 7, as viewed in Fig. 1, so that energy is stored within the energy storing means 13. If the pilot simply releases the lever 1, it remains in the position to which it has been moved, or the pilot can turn the lever 1 back towards its starting position in order to reduce the blade pitch angle. When the lever 1 is turned back by the pilot in this way the lever 4 does not follow the lever 1 since the spring 13 cannot move the piston 6 to the left, as viewed in Fig. 1, because of the check valves 10 and 11. The pressure with which the spring 13 acts on the piston 6 is transferred through the liquid in the cylinder 7 and along the conduit 15 to the valve 22. Thus, the lever 4 remains in the position to which it has been moved by the pilot and the pilot is free to turn the adjusting lever 1 downwardly as long as the valve 22 remains in its closed position.

If the speed of rotation of the rotor of the helicopter falls below a permissible limit, the movable control member of the centrifugally operated switch 28, 29 moves to a position which opens the switch and thus deenergizes the electromagnet 23. The elements 28, 29 form a conventional centrifugally operated switch which is well known. Thus, when the operating conditions are such that the speed of rotation of the rotor 32 falls below a certain value the electromagnet 23 is automatically deenergized to release the lever 22' to the spring 24 which turns the lever 22' and the valve 22 therewith to the open position of this valve. The liquid within the cylinder 7 can now flow from the chamber 8 through the conduit means 15, 16, 17 to the chamber 9, and the throttle valve 21 retards the speed of movement of the liquid through the conduit means, so that the piston rod 5 is not moved too quickly by the energy storing means 13. This energy storing means expands and acts through the piston rod 5 on the lever 4 to return the latter to its starting position, and the stop 3 engages the stop 2 to return the lever 1 to its starting position, so that in this way the blade pitch angle is automatically decreased.

If the pilot does not operate the lever 1 at this time, the lever 1 simply moves toward its starting position and the blade pitch angle automatically assumes a low value suitable for the flying conditions which occur at autorotation of the rotor. Such an operation is suitable if the altitude of the aircraft is great enough in order to permit the aircraft to level off properly so as to make a good autorotation landing. The speed with which the blade pitch angle is changed by the automatic control structure is controlled by the setting of the throttle valve 21.

It is possible, however, for the pilot to hold the lever 1 against movement by the spring 13 or even to move the lever 1 against the force of the spring 13 so as to increase the blade pitch angle, since the spring 13 is carefully designed so as to have a force capable of automatically actuating the structure which adjusts the blade pitch angle but at the same time being small enough to permit the pilot to overcome this force manually. Thus, it is possible with the structure of the invention for the pilot to manually control the lever 1 even when the speed of rotation of the rotor 32 falls below a given value so that it is possible to make a gentle landing when the speed of rotation of the rotor 32 falls at a low altitude.

Figure 2:
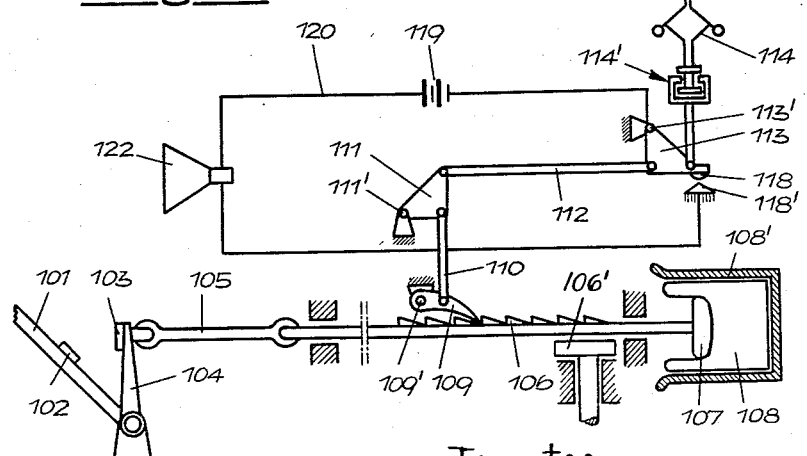
Fig. 2 is a diagrammatic illustration of another embodiment of the control apparatus according to the present invention.

According to the embodiment of the invention which is shown in Fig. 2, a lever 101 identical with the lever 1 carries a stop 102 which cooperates with a stop 103 of a lever 104 which is turnable about the same axis as the lever 101, elements 101—104 corresponding respectively to elements 1—4 of Fig. 1. The lever 104 is interconnected through a link 105 with a rack 106 supported by suitable bearings for longitudinal movement in both directions to the right and left, as viewed in Fig. 2. The end of the rack 106 which is distant from the link 105 fixedly carries a plate 107 which presses against a deformable container 108 which is filled with a gas such as air under pressure, so that the energy storing means of Fig. 2 is pneumatic. The container 108 is itself supported within a container 108' fixed to the aircraft.

A pawl 109 cooperates with the teeth of the rack 106 to prevent the latter from moving to the left, as viewed in Fig. 2, and this pawl is turnable about a pivot pin 109' which is also fixed to the aircraft. A link 110 interconnects the pawl 109 with a lever 111 which is pivotal on a pivot pin 111' fixed to the aircraft, and the lever 111 is interconnected through a link 112 with a lever 113 which is pivotally carried by a stationary pivot pin 113'. The lever 113 is connected to a speed-responsive centrifugal control 114 which is connected through the gearing 115 and 116 with the shaft 117 of the main rotor of the helicopter. The linkage 110—113 is such that during rotation of the rotor at normal speeds the pawl 109 cooperates with the rack 106 while when the speed of rotation of the rotor falls below a predetermined minimum value the centrifugal control 114 causes the lever 113 to turn in a clockwise direction, as viewed in Fig. 2, through an angle sufficient to cause the lever 111 to turn in a counterclockwise direction sufficiently to raise the pawl 109 out of engagement with the teeth of the rack 106.

The lever 113 carries an electrical contact 118 which is insulated from the lever 113 and which is electrically connected with one pole of a battery 119. The other pole of the battery 119 is connected through a conductor 120 with a contact of an electrical horn 122 whose other contact is electrically connected with a contact 118' which is located opposite and cooperates with the contact 118 carried by the lever 113. The arrangement is such that when the speed of rotation of the rotor falls below a given minimum value the contact 118 engages the contact 118' to close the circuit through the horn 122 in order to give an audible signal. The movement of the rack 106 when the pawl 109 is moved away from the same is damped by a suitable brake which engages the rack 106 to retard the movement thereof to the left, as viewed in Fig. 2, when the volume of the pneumatic container 108 expands, this brake device corresponding to the throttle valve 21 of Fig. 1.

With the embodiment of Fig. 2, when the pilot raises the lever 101 at the beginning of the flight, the rack 106 is moved to the right, as viewed in Fig. 2, and the plate 107 presses toward the interior of the container 108 to reduce the volume of the latter and to increase the pressure therein. The pawl 109 cooperates with the rack 106 to prevent the return of the rack towards its starting position, so that with the embodiment of Fig. 2 the pawl and rack form a part of a releasable holding means for releasably holding the energy storing means in its stressed condition, the valve 22 of Fig. 1 forming part of a releasable holding means for the embodiment of the invention shown in Fig. 1. The lever 101 can now be turned back, if desired, and the lever 104 will not participate in this return movement of the lever 101. When the speed of rotation of the rotor falls below the given minimum value, the centrifugal device 114 raises the pawl 109 and the lever 101 is returned toward its original position by the expanding container 108. The pilot can either permit this automatic operation to continue or can manually overcome the force of the energy storing means 108, this force being small enough to be manually overcome while at the same time being great enough to automatically move the lever 101 toward its rest position. In order to permit the pawl 109 to move up and down during advancement of the rack 106 to the right, as viewed in Fig. 2, a relatively large play is provided in the coupling 114' between the centrifugal control device 114 and the lever 113.

Instead of an acoustic signal 122, it is possible to provide an optical signal in the form of a lamp or a mechanical signal such as vibration of the pitch adjusting lever 101, when the speed of rotation of the rotor falls below the predetermined minimum value.

Figure 3:
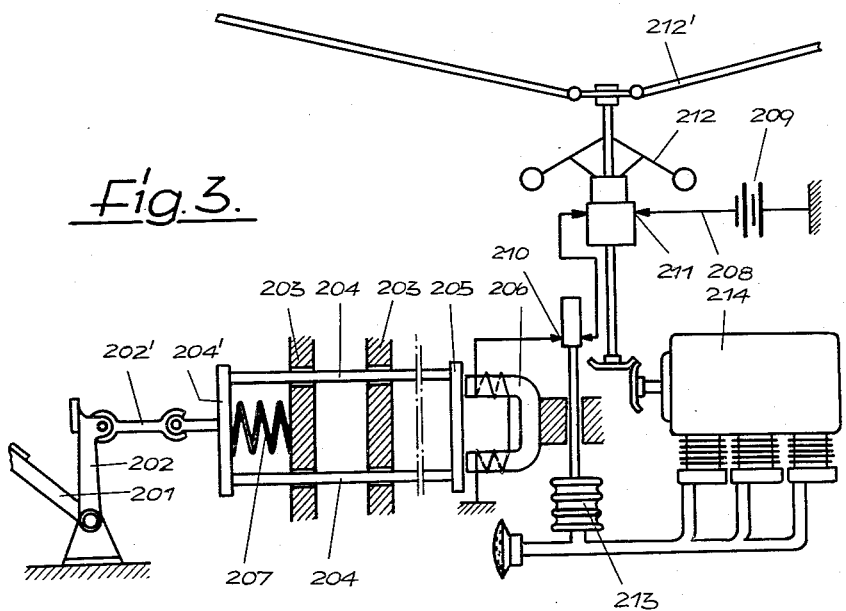
Fig. 3 is a diagrammatic illustration of still another control apparatus according to the present invention.

According to the embodiment of the invention which is shown in Fig. 3, a blade pitch adjusting lever 201 is provided in the same way as the adjusting lever of the embodiments of Figs. 1 and 2. This lever 201 cooperates with another lever 202 turnable about the same axis as the lever 201, and these levers respectively carry suitable stops in the same way as the above-described levers 101 and 104 of Fig. 2 and 1—4 of Fig. 1. The lever 202 is interconnected through a link 202' with a member 204', the link 202' being pivotally connected at its opposite ends to the elements 202 and 204', respectively. The element 204' is fixed to a pair of bars 204 which are parallel to each other and which are supported for longitudinal movement to the right and left, as viewed in Fig. 3, in a support means formed by suitable bearings 203 which are stationary with respect to the aircraft. The ends of the bars 204 distant from the element 204' fixedly carry an armature 205 which in its right end position, as viewed in Fig. 3, engages an electromagnet 206. An energy storing means in the form of a spring 207 is compressed between the left bearing 203 and the plate 204', this spring 207 urging the bars 204 together with the armature 205 to the left, as viewed in Fig. 3, away from the electromagnet 206, while the latter maintains the armature 205 in its right end position against the force of the spring 207 when the electromagnet 206 is energized.

One pole of the battery 209 is connected to a conductor 208, and a pair of switches 210 and 211 are connected into the conductor 208, this conductor 208 being connected to one end of the coil of the electromagnet 206. The other end of this coil is connected through ground with the other pole of the battery 209. The switch 211 forms part of a centrifugally operated switch which is open and closed by the centrifugal device 212 which is in driving engagement with the rotor 212'. The switch 210 is controlled by a pressure-responsive device such as a bellows 213 which is responsive to the suction pressure of the engine 214 of the aircraft. The switches 210 and 211 are so adjusted that when the rotor 212 turns at a speed below a predetermined value or when the force of suction of the engine 214 is not at a certain value the circuit through the conductor 208 is interrupted.

When the pilot first raises the blade pitch adjusting lever 201 at the start of a flight, the energy storing means 207 is compressed and the electromagnet 206 holds the armature 205 so as to prevent the return movement of the lever 202. When the force of suction of the engine is not at a certain value or when the speed of rotation of the rotor is below a certain value the circuit through the coil of the electromagnet 206 is interrupted and the spring 207 is then released to return the lever 202 toward its starting position, this lever 202 acting on the manually operable lever 201 to return the latter to its starting position.

The control for releasing the energy storing means can be taken from parts of the engine 214 other than the suction pressure thereof. Thus, for example, it is possible to make this control responsive to the pressure in the combustion chamber of a turbine or responsive to the turning moment of the drive motor.

The above-described features can, of course be combined with each other in any desired manner.

It will be understood that each of the elements described above, or two or more together, may also find a useful application in other types of control apparatus differing from the types described above.

While the invention has been illustrated and described as embodied in a helicopter control apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Control apparatus comprising, in combination, a manually operable adjusting means for manually adjusting an element to be controlled; energy storing means located in the path of movement of said manually operable adjusting means and being engaged and moved by the latter when said manually operable adjusting means is moved in a given direction for moving the element to be controlled in a given direction, said energy storing means having an inherent tendency to return with a given force to a position from which it is moved by said manually operable adjusting means and to return said adjusting means toward a position from which it has been moved by the operator, the force with which said energy storing means tends to return to the position from which it is moved by the operator being small enough to be overcome by the operator; releasable holding means cooperating with said energy storing means for releasably holding the same against return movement to the position from which it is moved by the operator; and automatic means cooperating with said releasable holding means for releasing the same to thereby release said energy storing means for return movement when certain operating conditions occur, whereby said energy storing means will act on said manually operable adjusting means to return the latter toward a rest position unless the operator manually controls the adjusting means against the force of said energy storing means.

2. In an apparatus for controlling the blade pitch of a helicopter rotor, in combination, a manually operable adjusting member moveable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position; and automatic means cooperating with said releasable holding means for releasing the latter when given operating conditions occur so as to release said energy storing means to move said adjusting member automatically in said opposite direction unless the operator manually prevents automatic movement of said adjusting member by said energy storing means.

3. In an apparatus for controlling the blade pitch of a helicopter rotor, in combination, a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increases in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position; and automatic means cooperating with said releasable holding means for releasing the latter when given operating conditions occur so as to release said energy storing means to move said adjusting member automatically in said opposite direction unless the operator manually prevents automatic movement of said adjusting member by said energy storing means, said energy storing means having a movable member which moves during operation of said energy storing means, and a stop fixed to said movable member and engaging said adjusting member.

4. In an apparatus for controlling the blade pitch of a helicopter rotor, in combination, a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position; and automatic means cooperating with said releasable holding means for releasing the latter when given operating conditions occur so as to release said energy storing means to move said adjusting member automatically in said opposite direction unless the operator manually prevents automatic movement of said adjusting member by said energy storing means, said adjusting member being turnable about a predetermined axis and said energy storing means including a member which also turns about said axis during operation of said energy storing means and which carries a stop which engages said adjusting member.

5. Control apparatus comprising, in combination, a manually operable adjusting means for manually adjusting an element to be controlled; energy storing means located in the path of movement of said manually operable adjusting means and being engaged and moved by the latter when said manually operable adjusting means is moved in a given direction for moving the element to be controlled in a given direction, said energy storing means having an inherent tendency to return with a given force to a position from which it is moved by said manually operable adjusting means and to return said adjusting means toward a position from which it has been moved by the operator, the force with which said energy storing means tends to return to the position from which it is moved by the operator being small enough to be overcome by the operator; releasable holding means cooperating with said energy storing means for releasably holding the same against return movement to the position from which it is moved by the operator; and automatic means cooperating with said releasable holding means for releasing the same to thereby release said energy storing means for return movement when certain operating conditions occur, whereby said energy storing means will act on said manually operable adjusting means to return the latter to its original position unless the operator manually controls the adjusting means against the force of said energy storing means, said automatic means being in the form of a device having a speed of rotation corresponding to that of the element to be controlled and including centrifugally movable means for actuating said automatic means to release said releasable holding means when said speed of rotation of said device is at a certain value.

6. Control apparatus as recited in claim 1, said control apparatus controlling the blade pitch of a helicopter rotor and said automatic means being in the form of a device rotatable at a speed proportional to that of the rotor and having centrifugal elements which cause said automatic means to release said releasable holding means when the speed of rotation of said device is at a certain value.

7. A control apparatus as recited in claim 1, and wherein said automatic means is responsive to the suction in an engine for releasing said releasable holding means when said suction is at a given value.

8. Control apparatus as recited in claim 1 and wherein said automatic means is responsive to the turning moment of an engine for releasing said releasable holding means when said turning moment is at a given value.

9. A control apparatus as recited in claim 1 and wherein said automatic means includes an electrical switch which opens to release said releasable holding means.

10. A control apparatus as recited in claim 1 and wherein a linkage is located between said automatic means and said releasable holding means for releasing the latter upon actuation of said linkage by said automatic means.

11. A control apparatus as recited in claim 1 and wherein a signal means is operatively connected with said automatic means for giving a signal when said automatic means releases said releasable holding means.

12. A control apparatus as recited in claim 1 and wherein said energy storing means is in the form of a spring.

13. Control apparatus comprising, in combination, a manually operable adjusting means for manually adjusting an element to be controlled; energy storing means located in the path of movement of said manually operable adjusting means and being engaged and moved by the latter when said manually operable adjusting means is moved in a given direction for moving the element to be controlled in a given direction, said energy storing means having an inherent tendency to return with a given force to a position from which it is moved by said manually operable adjusting means and to return said adjusting means toward a position from which it has been moved by the operator, the force with which said energy storing means tends to return to the position from which it is moved by the operator being small enough to be overcome by the operator; releasable holding means cooperating with said energy storing means for releasably holding the same against return movement to the position from which it is moved by the operator; automatic means cooperating with said releasable holding means for releasing the same to thereby release said energy storing means for return movement when certain operating conditions occur, whereby said energy storing means will act on said manually operable adjusting means to return the latter to its original position unless the operator manually controls the adjusting means against the force of said energy storing means; and damping means cooperating with said releasable holding means for acting on the latter to retard the movement of said energy storing means upon release of said releasable holding means.

14. In an apparatus for controlling the blade pitch of a helicopter rotor, in combination, a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement of its rest position; and automatic means cooperating with said releasable holding means for releasing the latter when the speed of rotation of the helicopter rotor falls below a given value, so as to release said energy storing means to move said adjusting member automatically in said opposite direction unless the operator manually prevents automatic movement of said adjusting member by said energy storing means.

15. In an apparatus for controlling the blade pitch of a helicopter rotor, in combination a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position, said releasable holding means comprising a cylinder adapted to be filled with a liquid, a piston slidable in said cylinder and engaging said energy storing means, check valve means carried by said piston for permitting liquid in the cylinder to flow in only one direction from one side of the piston to the opposite side thereof, conduit means communicating with the interior of said cylinder at opposite sides of said piston so that liquid in said cylinder may flow through said conduit means from one side of said piston to the other, valve means in said conduit means for opening and closing the same, and means cooperating with the valve means tending to maintain the same in a closed position closing said conduit means; and automatic means cooperating with said valve means of said releasable holding means for automatically moving said valve means from the closed to the open position thereof when predetermined operating conditions occur.

16. In an apparatus for controlling the blade pitch of a helicopter rotor, in combination a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means toward its rest position, said force being small enough to be manually overcome by the operator; releasable holding means releasably holding said energy storing means against return movement to its rest position, said releasable holding means comprising a rack, support means supporting said rack for longitudinal movement in opposite directions, and said energy storing means cooperating with the rack for urging the same to move in a direction in which said energy storing means returns to its rest position, and pawl means cooperating with said rack for releasably preventing movement thereof in said direction; and automatic means cooperating with said pawl of said releasable holding means for moving the same away from said rack when predetermined operating conditions occur to release said rack to said energy storing means.

17. In an apparatus for controlling the blade pitch of a helicopter rotor, in combinaion a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position, said releasable holding means comprising an electro-magnet, an armature, and support means supporting said armature for movement toward and away from said electro-magnet, said energy storing means cooperating with said armature for urging the same away from said electro-magnet, the latter when energized preventing movement of said armature by said energy storing means and said adjusting means being movable along a path which causes said adjusting means to move said armature toward said electro-magnet against the force of said energy storing means; and automatic means cooperating with said electro-magnet for de-energizing the same when predetermined operating conditions occur.

18. In an apparatus for controlling the blade pitch of a helicopter rotor, in combination a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position, said releasable holding means comprising a cylinder adapted to be filled with a liquid, a piston slidable in said cylinder and engaging said energy storing means, check valve means carried by said piston for permitting liquid in the cylinder to flow in only one direction from one side of the piston to the opposite side thereof, conduit means communicating with the interior of said cylinder at opposite sides of said piston so that liquid in said cylinder may flow through said conduit means from one side of said piston to the other, valve means in said conduit means for opening and closing the same, and means cooperating with the valve means tending to maintain the same in a closed position closing said conduit means; throttle valve means in said conduit means for retarding the flow of liquid therethrough; and automatic means cooperating with said valve means of said releasable holding means for automatically moving said valve means from the closed to the open position thereof when predetermined operating conditions occur.

19. In an apparatus for controlling the blade pitch of a helicopter rotor, in combination a manually operable adjusting member movable in one direction during an increase in the blade pitch angle and in an opposite direction during a decrease in the blade pitch angle; energy storing means located in the path of movement of said adjusting member to be engaged and moved thereby for storing energy during an increase in the blade pitch angle, said energy storing means having an inherent tendency to return to a rest position with a given force and said energy storing means engaging and moving said adjusting member in said opposite direction during return of said energy storing means towards its rest position, said force being small enough to be manually overcome by the operator; releasable holding means releasably holding said energy storing means against return movement to its rest position, said releasable holding means comprising a rack, support means supporting said rack for longitudinal movement in opposite directions, and said energy storing means cooperating with the rack for urging the same to move in a direction in which said energy storing means returns to its rest position, and pawl means cooperating with said rack for releasably preventing movement thereof in said direction; brake means cooperating with said rack for retarding the movement thereof upon movement of said pawl away from said rack; and automatic means cooperating with said pawl of said releasable holding means for moving the same away from said rack when predetermined operating conditions occur to release said rack to said energy storing means.

References Cited in the file of this patent
UNITED STATES PATENTS

| | | |
|---|---|---|
| 1,871,124 | Landrum | Aug. 9, 1932 |
| 2,209,879 | Focke | July 30, 1940 |